United States Patent [19]

Oberley

[11] 4,373,010

[45] Feb. 8, 1983

[54] NON-RESINOUS, UNCURED FIRE RETARDANT AND PRODUCTS PRODUCED THEREWITH

[75] Inventor: William J. Oberley, Monroeville, Pa.

[73] Assignee: Koppers Company, Inc., Pittsburgh, Pa.

[21] Appl. No.: 196,540

[22] Filed: Oct. 14, 1980

[51] Int. Cl.³ .................. B32B 23/04; B32B 29/00
[52] U.S. Cl. .................. 428/532; 106/18.15; 106/18.16; 427/394; 427/395; 427/396; 427/397; 428/537; 428/920; 428/921
[58] Field of Search .......... 427/391, 384, 392, 385.5, 427/393, 394, 393.3, 395, 439, 396, 440, 397; 428/537, 532, 920, 921; 252/606, 607, 608, 610, 611; 106/18.13, 18.14, 18.18, 18.21, 18.22, 18.31, 18.3, 18.15, 18.16

[56] References Cited

U.S. PATENT DOCUMENTS

| | | | |
|---|---|---|---|
| 2,917,408 | 12/1959 | Goldstein et al. | 106/18.14 |
| 3,137,607 | 6/1964 | Goldstein et al. | 156/319 |
| 3,159,503 | 12/1964 | Goldstein et al. | 428/921 |
| 3,253,881 | 5/1966 | Donahue | 106/18.14 |
| 3,816,212 | 6/1974 | O'Brien | 106/18.14 |
| 3,832,316 | 8/1974 | Junga | 260/29.4 R |
| 3,874,990 | 4/1975 | Surdyk | 106/18.14 |
| 4,010,296 | 3/1977 | Oberley | 427/440 |

*Primary Examiner*—S. L. Childs
*Attorney, Agent, or Firm*—Donald M. MacKay; Herbert J. Zeh, Jr.; Oscar B. Brumback

[57] ABSTRACT

Synergistic fire retardants for wood and other cellulosic materials which are substantially non-hygroscopic and which do not require high curing temperatures in the material treated are formed of the partial reaction product of dicyandiamide, phosphoric acid, boric acid and water wherein the combined weight ratio of dicyandiamide and phosphoric acid to boric acid is from about 60 to about 40 to from about 90 to about 10.

34 Claims, 2 Drawing Figures

NON-RESINOUS, UNCURED FIRE RETARDANT AND PRODUCTS PRODUCED THEREWITH

BACKGROUND OF THE INVENTION

This invention is directed to the chemical treatment of wood and other cellulosic materials to render them fire retardant. More particularly, this invention is directed to synergistic fire retardant compositions which are substantially non-hygroscopic consisting essentially of the partial reaction product of dicyandiamide, phosphoric acid, boric acid and water.

It has become the practice in the wood treating industry to treat wood with chemical compounds to preserve the wood. Chemicals suggested for this purpose include ammonium phosphate, ammonium chloride, ammonium sulfate, phosphoric acid, zinc chloride, and magnesium chloride. These chemicals are impregnated as solutions into the wood where they are deposited within the pores of the wood when the solution evaporates. However, these chemicals are only suitable for treating wood which is not subject to the leaching effect of rain and/or ground water. These chemicals are not suitable for exterior and underground construction where leach resistant fire retardants are necessary. In addition, some of these chemicals are objectionable because they are very corrosive to any metal which may be in contact with the treated wood. Some of the chemicals also cause an objectionable afterglow with the wood and are detrimental to the structural strength of the treated wood. Moreover, many of these chemicals are hygroscopic which causes the wood to absorb moisture and bloom which makes their use objectionable. More recently, there has been a trend in the wood treating industry towards fire retardant chemical treatments which have low hygroscopicity and are leach resistant and which can be used for exterior wood. Many of these fire retardant chemical treatments for exterior wood have been based on amine-aldehyde-phosphorus condensation compounds. In accordance with the general practice, wood is impregnated with a solution of an incompletely reacted amine-aldehyde-composition together with an oxy acid of phosphorus. The impregnated wood is then dried and cured.

For example, Goldstein et al., U.S. Pat. No. 2,917,408 disclose the preparation of fire retardant wood with a combination of dicyandiamide and phosphoric acid, and Goldstein et al., U.S. Pat. No. 3,159,503 disclose the preparation of fire retardant wood with a combination of dicyandiamide, phosphoric acid and very small amounts of formaldehyde. In addition, Juneja, U.S. Pat. No. 3,832,316 discloses a composition for imparting fire retardancy to wood comprising dicyandiamide, melamine, formaldehyde, and phosphoric acid and suggests that minor amounts of other materials may be substituted for some of the phosphoric acid, such as boric acid, and Juneja, Canadian Pat. No. 917,334 discloses a composition for treating wood to impart fire retardancy thereto comprising dicyandiamide, urea, formaldehyde and phosphoric acid and suggests that minor amounts of other materials may be substituted for some of the phosphoric acid, such as boric acid. Other similar patents include U.S. Pat. Nos. 2,935,471; 3,137,607; 3,874,990 and 4,010,296.

While most of the above described chemical compositions based on dicyandiamide, melamine, urea, formaldehyde and phosphoric acid are effective for imparting fire retardancy to wood, they suffer from one or more drawbacks. Compositions containing solids of more than about 15 percent urea render the wood hygroscopic. Further, these compositions containing formaldehyde tend to be resinous and require high drying temperatures of about 100° C. to 110° C. to completely cure the resin, thereby impairing the strength of the wood.

BRIEF DESCRIPTION OF THE INVENTION

It has been now discovered that the aforesaid disadvantages can be obviated and a superior fire retardant formed of the partial reaction product of water, phosphoric acid, dicyandiamide and boric acid.

DETAILED DESCRIPTION OF THE INVENTION

Figure 1:
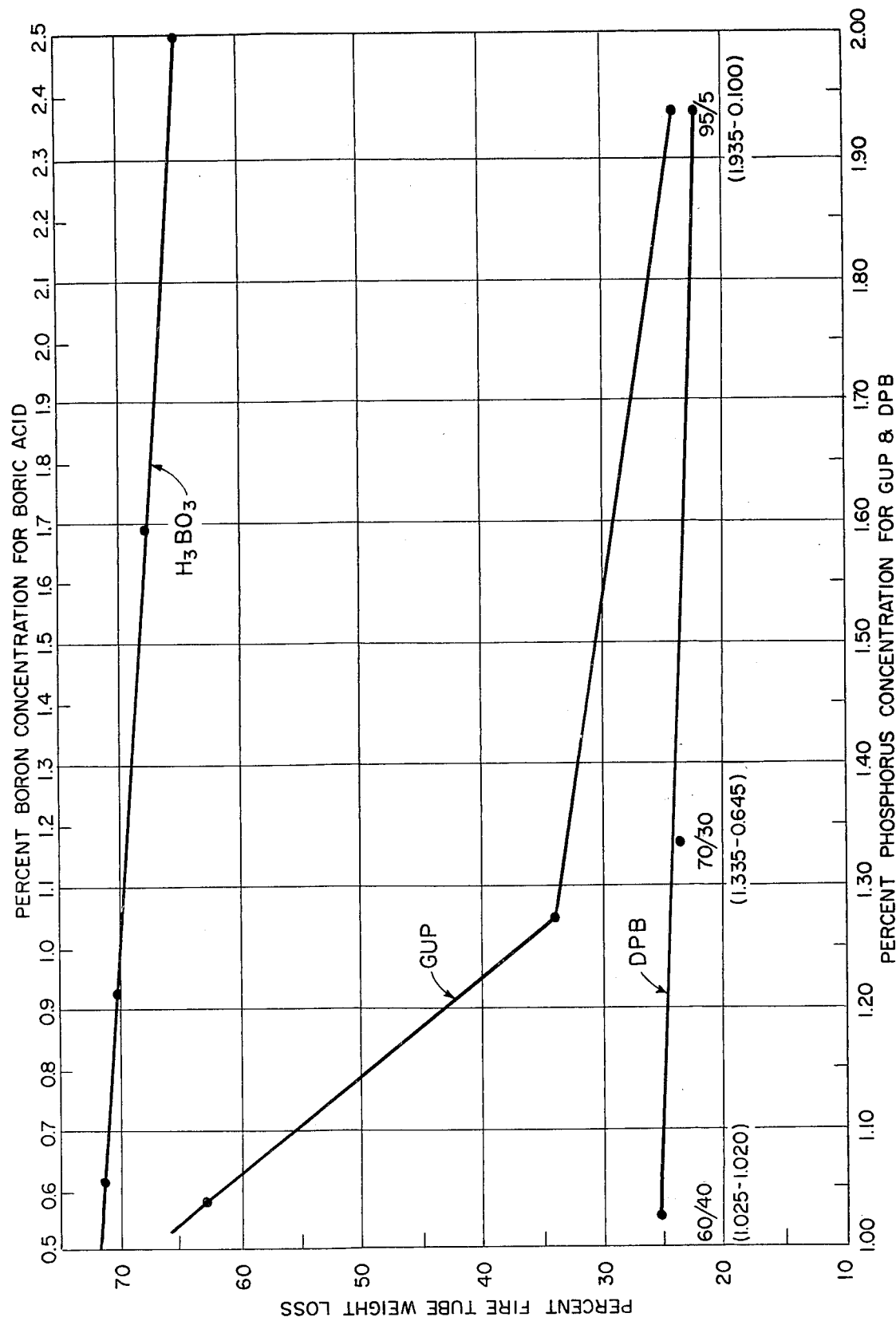
FIG. 1 is a graph plotting the differences in weight loss of burned wood samples treated with boric acid, guanylurea phosphate or compositions of the invention as measured by fire tube tests.

The water, phosphoric acid, boric acid and dicyandiamide ingredients can be heated with agitation at a temperature of between about 70° C. and about 90° C. but preferably at a temperature of about 80° C. in an inert reaction vessel such as glass or stainless steel. Preferably, the dicyandiamide is reacted first with the phosphoric acid for about 35 to about 45 minutes to form guanylurea phosphate (GUP) in a 50–70 percent concentration of solids leaving between about 5 and about 20 percent unreacted dicyandiamide and phosphoric acid which reduces the likelihood of the formation of insoluble products. The boric acid is then added with agitation and the mixture cooled to ambient temperature and diluted to from about 3 to about 18 percent solids to prepare a treating solution consisting principally of guanylurea phosphate, boric acid and small amounts of phosphoric acid and dicyandiamide. No attempt is made to recover any unreacted materials or by-products. Less desirably, the water, dicyandiamide and boric acid can be reacted with agitation for from about 35 to about 45 minutes to form an unidentified reaction product, believed to be guanylurea borate, in an amount of between about 15 and about 25 percent concentrations of solids, which is difficulty soluble in water until the phosphoric acid is then added. The reaction is then cooled to ambient temperature and diluted to from about 3 to about 18 percent solids to prepare a treating solution. Preferably, about 5 percent to about 20 percent of the original amount of phosphoric acid and dicyandiamide is unreacted. While clear solutions are sometimes formed when all of the ingredients are initially heated together, the reaction of the phosphoric acid, dicyandiamide and water first, before introduction of the boric acid, results in solutions which are generally clear at reaction temperatures, even at high concentrations of about 50 to 80 percent. Upon cooling at these concentrations, a slurry or thick paste is formed. Consequently, they are desirably diluted to treating solutions as soon as convenient. For those reactions which result in a moderate amount of precipitates due to over-reaction, it has been found that these can be solubilized by adding a minor but effective amount of an acid such as between about 0.10 percent and about 0.35 percent of an acid such as $H_2SO_4$, HCl, HBr, $HNO_3$ and $NH_2HSO_3$ or mixtures to the solution.

Dilute aqueous wood treating solutions of about 5–20 percent can be conveniently prepared as follows. The dicyandiamide is charged to an inert reaction vessel, such as stainless steel, with agitation followed by the water and phosphoric acid. The mixture is then heated to 80° C. and maintained at that temperature for up to about 3½ hours until reaction is essentially complete (i.e., 80–95 percent of dicyandiamide is reacted), as evidenced by pH and titration curves. The boric acid is then added and the solution cooled to room temperature and is ready for use.

While the invention is illustrated by the treatment of wood for convenience, other cellulosic materials can be rendered flame resistant with the compositions of the invention to include paper, cardboard, cotton, jute and hemp.

To prepare the fire retardant compositions of the invention, the weight ratio of dicyandiamide and phosphoric acid (GUP) to boric acid is from about 60 GUP to about 40 boric acid to from about 90 GUP to about 10 boric acid. A more preferred composition, in which the guanylurea phosphate formed is more soluble, has a weight ratio of from about 65 to about 35 to about 75 to about 25. A most preferred composition has a weight ratio of from about 70 to about 30. The mole ratio of dicyandiamide to phosphoric acid is from 1.0 to about 0.8–1.2 and the mole ratio of boric acid to combined dicyandiamide and phosphoric acid is from about 0.2–1.5 to 1.0. Most preferably, the former ratio is about 1 to 1, and the latter ratio about 1.0 to about 1.35.

The solids content of the fire retardant treating solution can be from about 3 percent to about 18 percent, with a preferred range of between about 5 percent and about 15 percent and with a most preferred range between about 7 percent and about 11 percent.

Surprisingly, the boric acid increases the solubility of the guanylurea phosphate. Thus at 25° C., guanylurea phosphate is only 9 percent soluble in water, and boric acid 5 percent, whereas a mixture of 70 percent guanylurea phosphate and 30 percent boric acid is 18 percent soluble in water or a 28 percent increase over the additive solubilities. High concentration solutions of 13 to 18 percent are desirable for hardwoods and other high density species wherein, if heating were required to solubilize the ingredients, undesirable hygroscopic by-products would be formed. Further, the guanylurea phosphate-boric acid product is more stable at cold temperatures than guanylurea phosphate and also is less corrosive. In addition, the guanylurea phosphate-boric acid product is resistant to microorganisms that normally grow with guanylurea phosphate, it causes less smoke than conventional fire retardants, is essentially non-hygroscopic as is untreated wood, and can be dried at lower temperatures so as not to impair the strength of the wood.

The term "phosphoric acid" as used herein is meant to be inclusive of all of the oxy acids of phosphorus. The term phosphoric acid is inclusive of such forms as $H_3PO_4$, $H_3PO_3$, $2H_3PO_4.H_2O$, $H_4P_2O_7$, $H_4P_2O_6$, $HPO_3$, the polyphosphoric acids and mixtures of the above.

The term "boric acid" as used herein is meant to be inclusive of $B(OH)_3$, $HBO_2$, $HBO_3$, $H_2B_4O_7$, $B_2O_3$ and mixtures of the above.

The term "partial reaction product" as used herein is intended to mean that less than the total amount of each ingredient undergoes a chemical change but that at least 50 percent of the dicyandiamide and phosphoric acid will react and preferably between about 80 percent and about 95 percent.

If desired, small amounts of other materials can be added so long as they do not substantially affect the desireable properties of the fire retardant such as urea of from about 5 to about 10 percent by weight of the total solids can be substituted for part of the dicyandiamide, but should not be added in an amount to increase hygroscopicity. Similarly, about 1 percent formaldehyde by weight of the dicyandiamide can be incorporated for slime control. Small amounts of fire retardant acids, such as HCl, $H_2SO_4$, $NH_2SO_3H$ and HBr of about 5 to about 10 percent by weight of the phosphoric acid can be incorporated. Other additives will occur to one of ordinary skill, but any additive employed should not materially affect the non-resinous, non-hygroscopic nature of the fire retardant or its fire retardant properties.

The wood can be treated by one of the various techniques which are well known in the art. Examples of some of these methods are soaking, diffusion into green wood, vacuum pressure impregnation, and compression impregnation. The particular technique used will be determined by such factors as the species of wood being treated, the thickness of the wood, the degree of fire retardancy required and the end use of the treated wood product. In addition, the percent solids concentration of the aqueous impregnating solution will be dictated to a large extent by the treating method employed and the degree of fire retardance required.

After being treated with the aqueous solution of fire retardant chemicals, the wood is thereafter dried in a conventional manner by exposure to ambient conditions or by heating to a temperature of from about 40° C. to about 70° C. to a fairly low moisture content of about 20 percent. Because the fire preservative is non-resinous, a curing cycle is not required. Therefore, wood strength is not impaired.

The following examples will serve to illustrate the invention. All parts and percentages in said examples and elsewhere in the specification and claims are by weight unless otherwise specified.

EXAMPLE 1

A 15 percent aqueous treating solution formed of dicyandiamide, phosphoric acid and boric acid (DPB) in a ratio of 70 percent combined dicyandiamide and phosphoric acid to 30 percent boric acid is prepared from 505 g (6 moles) dicyandiamide, 588 g (6 moles) phosphoric acid, 515 g (8.3 moles) boric acid and 9832 g (546 moles) water, of which 108 g is water of hydrolysis. While agitating, the dicyandiamide is charged to a glass reaction flask, followed by the water and phosphoric acid. The mixture is then heated to 80° C. over a period of 20 minutes and maintained at that temperature for 3½ hours. The boric acid is added and the solution then cooled to room temperature (25° C.) over a period of 30 minutes. The resultant solution comprises principally guanylurea phosphate, unreacted dicyandiamide and phosphoric acid of about 10 percent of the original amount, and boric acid.

EXAMPLE 2

A portion of fire retardant sufficient to immerse the samples to be treated prepared by the general procedure of Example 1 was diluted to a 7 percent solution with brated flame was then applied to the bottom of the sample in which the distance from the top of the burner to the bottom of the sample was 1 inch. The burner was adjusted to provide a flame height of 11" and a temperature at the top of the fire tube (in the absence of a sample) of 175° C. to 180° C. The treated samples and untreated controls were suspended over the flame for a period of 4 minutes. For the boric acid samples the burning continued after the pilot flame was removed while flame out was immediate for the other treated samples. The weight of the non-consumed sample was subtracted from the original weight to determine weight loss and is reported in FIG. 1. Each point on the graph represents an average of two or three tests. From the data, it can be seen that the boric acid treated samples have little fire retardant effect whereas the mixture of GUP and boric acid show a synergistic fire retardant effect over the additive effects of GUP and boric acid.

EXAMPLE 8

Figure 2:
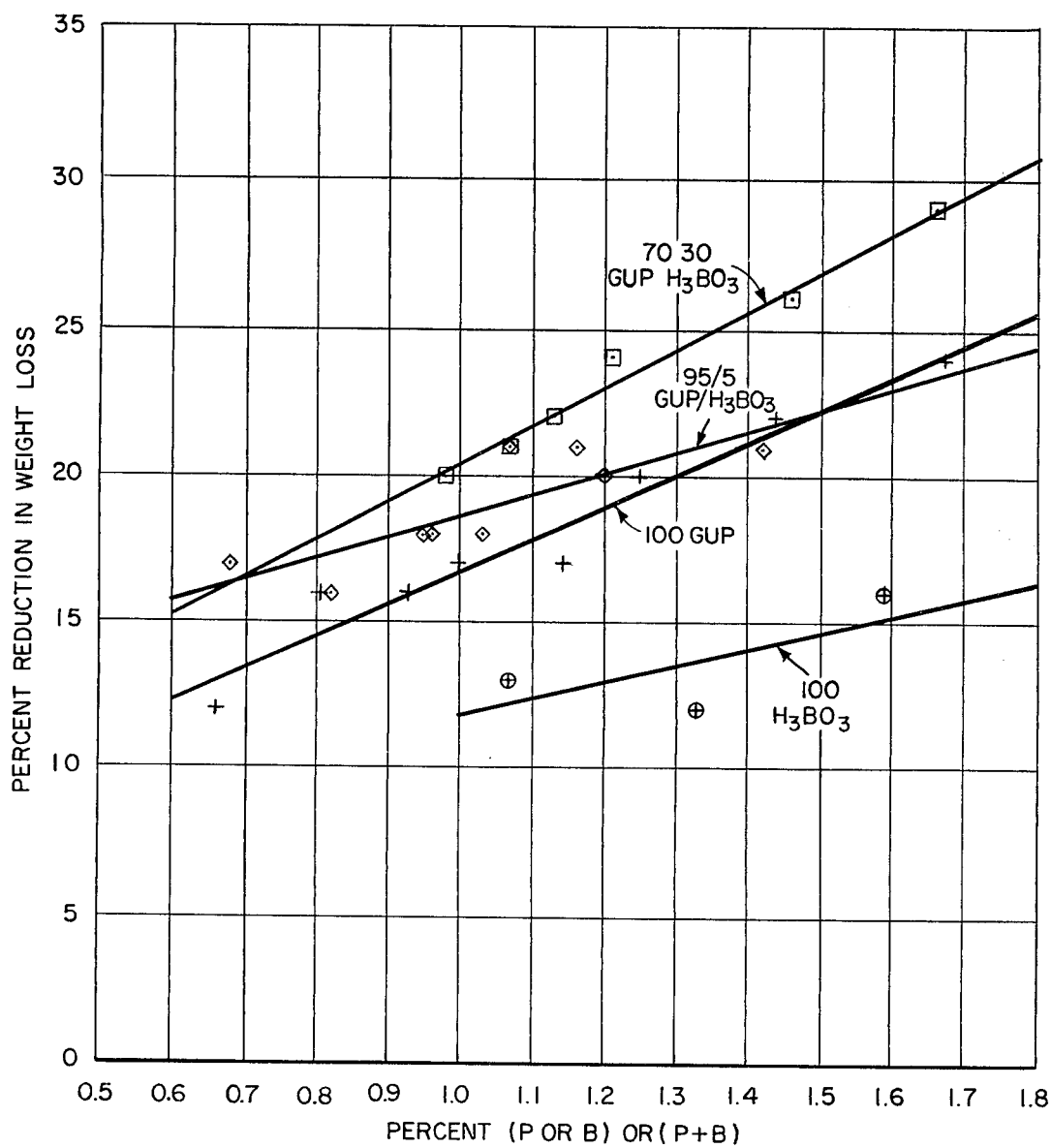
FIG. 2 is a graph depicting the differences in weight loss as measured by thermogravimetric analysis.

The general procedure of Example 6 was repeated with 70/30 and 95/5 weight percent DBP compositions and compared with wood treated with their component parts and an untreated control by the TGA technique. The reduction in weight loss is reported in FIG. 2. From the data it can be seen that the combination of boric acid and guanylurea phosphate gives a reduction in weight loss substantially greater than an equivalent fire retardant amount of B or P in boric acid or guanylurea phosphate when either is used alone. While the 95/5 weight ratio of GUP to boric acid is only more effective at low retentions, the 70/30 mixture is more effective over a wide range and increases with increasing retention. Furthermore, boric acid alone is seen to be of little value even at high retentions.

EXAMPLE 9

The compatibility of various wood preservatives with an aqueous 9 percent solution of GUP was tested by adding various known wood preservatives to the solution to achieve their commercial concentrations. The results are shown in the following table wherein all preservatives other than boric acid are incompatible with the exception of acid copper chromate (ACC) which has only limited use because it is ineffective against insects and most fungi.

TABLE III

| Wood Preservatives | Solubility |
|---|---|
| <2% pentachlorophenol | insoluble |
| <2% sodium pentachlorophenol | " |
| 2% copper sulfate | precipitates form after 1 day |
| 3.5% chromated zinc chloride | precipitates form after 1 day |
| 2% chromated copper arsenate | precipitates form after 6 days |
| 2% ammoniacal copper arsenate | precipitates form after 6 days |
| 3% acid copper chromate | stable |
| 2% fluoxide, chrome, arsenate-dinitrophenol | precipitates form after 1 day |
| 1-50% boric acid | stable |

EXAMPLE 10

The general procedure of Example 1 is repeated several times but with the exception that the boric acid is added following the water and the phosphoric acid added when the heating is discontinued, or all of the ingredients are heated together. Clear solutions are only sporadically produced but they are found to have the synergistic fire retardant properties of the solutions prepared by the procedure of Example 1. The solutions which are not clear are less desirable as they contain insolubles which are difficult to impregnate into some cellulosic materials.

While the invention has been illustrated by the use of aqueous solutions, some cellulosic materials, such as paper insulation, can be treated with a free-flowing powder of the invention by forcing the powder into the matrix, such as by pressing, hammering and the like. In other applications, the cellulosic material, such as wood shreds, particles or chips and the like, can be blended with the dry free-flowing preservative powder and mixed with an adhesive and compacted to prepare the product.

What is claimed:

1. A synergistic fire retardant composition useful for treating cellulosic materials consisting essentially of the partial reaction product of dicyandiamide, phosphoric acid, boric acid and water wherein prior to reaction the mole ratio of dicyandiamide to phosphoric acid is from 1.0 to about 0.8-1.2 and the mole ratio of boric acid to combined dicyandiamide and phosphoric acid is from about 0.2-1.5 to 1.0.

2. The composition of claim 1 wherein the solids content is from about 3 percent to about 18 percent.

3. The composition of claim 1 wherein the solids content is from about 5 percent to about 15 percent.

4. The composition of claim 1 wherein the solids content is from about 7 percent to about 11 percent.

5. The composition of claim 1 wherein prior to reaction the weight ratio of combined dicyandiamide and phosphoric acid to boric acid is from about 60 to about 40 to from about 90 to about 10.

6. The composition of claim 1 wherein prior to reaction the weight ratio of combined dicyandiamide and phosphoric acid to boric acid is from about 65 to about 35 to from about 75 to about 25.

7. The composition of claim 1 wherein prior to reaction the weight ratio of combined dicyandiamide and phosphoric acid to boric acid is from about 70 to about 30%.

8. The composition of claim 1 wherein prior to reaction the mole ratio of dicyandiamide to phosphoric acid is about 1 to about 1 and the mole ratio of boric acid to combined dicyandiamide and phosphoric acid is from about 1.0 to about 1.35.

9. The composition of claim 1 wherein from about 5 to about 20 percent of the original amount of dicyandiamide and phosphoric acid are unreacted.

10. A method of treating a cellulosic material to impart fire retardance thereto comprising impregnating said article with a fire retardant amount of a synergistic fire retardant composition of claim 1.

11. The method of claim 10 wherein the cellulosic material is treated with from about 3 to about 18 percent of said composition.

12. The method of claim 10 wherein the cellulosic material is wood.

13. The method of claim 10 wherein prior to reaction the weight of combined dicyandiamide and phosphoric acid to boric acid is from about 60 to about 40 to from about 90 to about 10.

14. The method of claim 10 wherein prior to reaction the weight ratio of combined dicyandiamide and phosphoric acid to boric acid is from about 65 to about 35 to from about 75 to about 25.

water and used to pressure impregnate five Douglas fir fire-tube specimens ⅜×⅜×40 inches long. The specimens were submersed in a treating cylinder designed for pressure impregnation and a vacuum applied of about 30 inches of Hg for 30 minutes, followed by a pressure impregnation period of 3 hours at about 150 p.s.i. The pressure was then released and the specimens removed from the cylinder and allowed to air dry for one day and then oven dried at about 50° C. until an equilibrium was reached of about 5 percent moisture.

EXAMPLE 3

A ponderosa pine 2"×4" was treated by the pressure impregnation method of Example 2 with a 12 percent aqueous solution of guanylurea phosphate (GUP) made by the general procedure of Example 1 (without boric acid). Two identical GUP solutions, with the exception that they contained either 0.6 percent copper sulfate or 1 percent boric acid, were used to treat ponderosa pine specimens. The sample treated only with GUP was maintained for seven days in a walk-in sized chamber at 80° F. and 90 percent RH with good circulation and constant conditions. During this time, its surfaces became covered with a heavy Aspergillus niger growth.

The samples containing 0.6 percent copper sulfate and 1 percent boric acid and an untreated control were placed on the growth covering the GUP 2"×4". Growth appeared within a few days on the untreated control and the sample containing copper sulfate, but it took 30 days for growth to appear on the GUP containing 1 percent boric acid. Samples treated with a 10 percent solution of DPB (dicyandiamide-phosphoric acid-boric acid) in a weight ratio of 70 percent GUP (dicyandiamide-phosphoric acid) to 30 percent B (boric acid), remained free of growth after several months exposure.

EXAMPLE 4

A 10 percent solution as prepared by the general procedure of Example 1 was used to treat Ponderosa pine samples (3) to a retention of about 20 percent in a vacuum desiccator. Samples were submersed in the liquid treating solution and air was removed under vacuum by an asperator until bubbles no longer came out of the solution in the wood. Then the vacuum was removed and atmospheric pressure was used to fully inject the solution into the sample. The samples were then dried to 0 percent moisture in a 50° C. oven. The samples were then placed, along with an untreated control, in the aforesaid walk-in sized chamber at 80° F. and 90 percent relative humidity (RH) for 30 days to determine hygroscopicity properties. The results are given as follows:

TABLE I

| Sample No. | Moisture Gain (%) |
| --- | --- |
| 1 | 19.3 |

TABLE I-continued

| Sample No. | Moisture Gain (%) |
| --- | --- |
| 2 | 19.8 |
| 3 | 22.6 |
| Control | 20.2 |

The results indicate that the DPB treated wood is no more hygroscopic than untreated wood.

EXAMPLE 5

Portions of a 15 percent solution as prepared by the general procedure of Example 1 were diluted with water to 7 percent and 9 percent solutions and injected into wood specimens by the method of Example 4 and the specimens tested for hygroscopicty at 80° F. and 90 percent RH against a control and a commercial fire retardant NON-COM E. The results are as follows:

TABLE II

| Solution (%) | Moisture Gain (%) |
| --- | --- |
| 7 DPB | 19.8 |
| 9 DPB | 20.2 |
| 11 NON-COM E | 126.7 |
| Control | 20.2 |

The NON-COM E treated sample exceeded fiber saturation (became wet) whereas the DPB samples and the untreated control were dry and well below fiber saturation.

EXAMPLE 6

To test for comparative fire retardancy of GUP (guanylurea phosphate), DPB (product of dicyandiamide, phosphoric, water and boric acid) and $H_3BO_3$ (boric acid), wood samples were impregnated by the procedure of Example 4 with one of the aforesaid materials. TGA (thermogravimetric analysis) and TEA (thermal evolution analysis) were employed to determine the weight loss for the samples. The F.C. (fuel contribution) expressed as the percent of the combustability of an untreated control was determined by heating the samples to 480° C. and 500° C., respectively, at a 20° C. increase per minute (under nitrogen) in a DuPont Model 916 TEA module or a Perkin Elmer TGS-2 thermogravimetric system, to measure the amount of organic combustible volatiles generated and the weight loss, respectively. Thus, the lower the F.C., the more fire retardant the sample.

TABLE III

| Sample | Element Ret. (%) | TGA Wt. Loss (%) | TGA Wt. Loss Reduction (%) | Temp. (°C.) | TEA Wt. Loss (%) | TEA Wt. Loss Reduction (%) | F.C. (%) |
| --- | --- | --- | --- | --- | --- | --- | --- |
| GUP | 2.02 P | 56 | 31 | 475 | 57 | 31 | 39 |
| DPB | 1.38 P + 0.67 B | 53 | 35 | 475 | 52 | 37 | 31 |
| $H_3BO_3$ | 2.05 B | 65 | 20 | 475 | 66 | 20 | 65 |
| Control | — | 81 | — | 475 | 82 | — | 100 |

From the results it can be seen that DPB at a like concentration of fire retardant element is 28% more effective than GUP and 111% more effective than the $H_3BO_3$ treated sample as measured by fuel contribution.

EXAMPLE 7

Fire tube tests were run by the general procedure of ASTM E69-50 in which ⅜"×⅜"×40" wood samples were heated with the fire retardant by the general procedure of Example 4, kiln dried, allowed to equilibrate at ambient conditions (75° F., 35% relative humidity) and placed in a metallic tube having vent holes. A cali- 15. The method of claim 10 wherein prior to reaction the weight ratio of combined dicyandiamide and phosphoric acid to boric acid is from about 70 to about 30.

16. The method of claim 10 wherein prior to reaction the mole ratio of dicyandiamide to phosphoric acid is from 1.0 to about 0.8–1.2 and the mole ratio of boric acid to combined dicyandiamide and phosphoric acid is from about 0.2–1.5 to 1.0.

17. The method of claim 10 wherein prior to reaction the mole ratio of dicyandiamide to phosphoric acid is about 1 to 1 and the mole ratio of boric acid to combined dicyandiamide and phosphoric acid is about 1.0 to about 1.35.

18. The method of claim 10 wherein from about 5 to about 20 percent of the original amount of dicyandiamide is unreacted.

19. A cellulosic material impregnated with a fire retardant amount of the synergistic fire retardant composition of claim 1.

20. The article of claim 19 wherein the cellulosic material is wood.

21. The article of claim 19 wherein prior to reaction the weight ratio of combined dicyandiamide and phosphoric acid to boric acid is from about 60 to about 40 to from about 90 to about 10.

22. The article of claim 19 wherein prior to reaction the weight ratio of combined dicyandiamide and phosphoric acid to boric acid is from about 65 to about 35 to from about 75 to about 25.

23. The article of claim 19 wherein prior to reaction the weight ratio of combined dicyandiamide and phosphoric acid to boric acid is from about 70 to about 30.

24. The article of claim 19 wherein prior to reaction the mole ratio of dicyandiamide to phosphoric acid is from 1.0 to about 0.8–1.2 and the mole ratio of boric acid to combined dicyandiamide and phosphoric acid is from about 0.2–1.5 to 1.0.

25. The article of claim 19 wherein prior to reaction the mole ratio of dicyandiamide to phosphoric acid is about 1 to 1 and the mole ratio of boric acid to combined dicyandiamide and phosphoric acid is from about 1.0 to about 1.35.

26. The article of claim 19 wherein from 5 to 20 percent of the original amount of dicyandiamide is unreacted.

27. A process for forming a synergistic fire retardant composition consisting essentially of the partial reaction product of water, phosphoric acid, boric acid, and dicyandiamide comprising heating with agitation at a temperature of between about 70° C. and about 90° C., water, phosphoric acid, and dicyandiamide until from about 80 to about 95 percent of the dicyandiamide and phosphoric acid has reacted and then adding the boric acid and cooling the resultant clear solution to ambient temperature, wherein water is employed as a solvent and the mole ratio of dicyandiamide to phosphoric acid is from about 1 to about 0.8–1.2 and the mole ratio of boric acid to combined dicyandiamide and phosphoric acid is from about 0.2–1.5 to about 1.

28. The process of claim 27 wherein the heating is conducted at about 80° C.

29. The process of claim 27 wherein the mole ratio of dicyandiamide to phosphoric acid is from about 1 to about 1 and the mole ratio of boric acid to combined dicyandiamide and phosphoric acid is from about 1 to about 1.35.

30. A process for forming a synergistic fire retardant composition consisting essentially of the partial reaction product of water, phosphoric acid, boric acid and dicyandiamide comprising heating with agitation at a temperature of between about 70° C. and about 90° C., water, boric acid, and dicyandiamide until from about 80 to about 95 percent of the dicyandiamide and boric acid has reacted and then adding the phosphoric acid and cooling the resultant clear solution to ambient temperature, wherein water is employed as a solvent and the mole ratio of dicyandiamide to phosphoric acid is from about 1 to about 0.8–1.2 and the mole ratio of boric acid to combined dicyandiamide and phosphoric acid is from about 0.2–1.5 to about 1.

31. The method of claim 30 wherein the heating is conducted at about 80° C.

32. The method of claim 30 wherein the mole ratio of dicyandiamide to phosphoric acid is from about 1 to about 1 and the mole ratio of boric acid to combined dicyandiamide and phosphoric acid is from about 1 to about 1.35.

33. The composition of claim 1 which additionally contains a minor but effective solubilizing amount of an acid.

34. A method of solubilizing precipitates formed from the reaction of dicyandiamide, phosphoric acid, boric acid and water, which comprises adding a minor but effective amount of an acid.

* * * * *